US008189010B2

(12) United States Patent
Mebane

(10) Patent No.: US 8,189,010 B2
(45) Date of Patent: May 29, 2012

(54) SYSTEMS AND METHODS FOR COLOR GAMUT MAPPING

(75) Inventor: Waleed Mebane, Belmont, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 733 days.

(21) Appl. No.: 12/336,327

(22) Filed: Dec. 16, 2008

(65) Prior Publication Data

US 2010/0149203 A1    Jun. 17, 2010

(51) Int. Cl.
*G09G 5/02* (2006.01)
(52) U.S. Cl. ........ 345/590; 345/589; 345/591; 345/600; 345/601; 345/602; 345/603; 345/604; 358/1.9; 358/518; 382/162; 382/167
(58) Field of Classification Search .......... 345/589–591, 345/600–604; 358/1.9, 518; 382/162, 167
See application file for complete search history.

(56) References Cited

U.S. PATENT DOCUMENTS

| | | | |
|---|---|---|---|
| 6,480,301 B1* | 11/2002 | Cholewo | 358/1.9 |
| 6,724,500 B1* | 4/2004 | Hains et al. | 358/1.9 |
| 7,330,193 B2* | 2/2008 | Bhattacharjya | 345/593 |
| 7,755,817 B2* | 7/2010 | Ho et al. | 358/523 |
| 7,813,001 B2* | 10/2010 | Kubo | 358/1.9 |
| 7,929,760 B2* | 4/2011 | Tamagawa | 382/167 |
| 7,978,369 B2* | 7/2011 | Haikin | 358/1.9 |
| 2004/0096104 A1* | 5/2004 | Terekhov | 382/167 |
| 2007/0230777 A1* | 10/2007 | Tamagawa | 382/162 |

* cited by examiner

*Primary Examiner* — Xiao M. Wu
*Assistant Examiner* — Todd Buttram
(74) *Attorney, Agent, or Firm* — Finnegan, Henderson, Farabow, Garrett & Dunner, L.L.P.

(57) ABSTRACT

Systems and methods are provided for an efficient computational scheme that permits the mapping of a color to a device gamut. In some embodiments, the device gamut may be represented in a device independent color space, which may be a perceptually uniform color space. In some embodiments, a set of non-overlapping contiguous tetrahedra may be used to partition entire device gamut. In some embodiments, the disclosed methods permit the identification of a destination color equivalent to the input color in the device independent space by intelligently narrowing the search space for tetrahedra enclosing the input color in the device gamut and permitting the identification of a color equivalent in the destination gamut in the input color space even when the input color lies outside the searched tetrahedra.

20 Claims, 9 Drawing Sheets

SYSTEMS AND METHODS FOR COLOR GAMUT MAPPING

TECHNICAL FIELD

This disclosure relates to the field of graphics and color management, and in particular to techniques for mapping colors to device gamuts.

DESCRIPTION OF RELATED ART

Graphical output devices that deal with the reproduction of color images typically have a range of colors that can be accurately rendered by the device. The range of colors that a device can render is termed the gamut or color gamut of the device. The range of colors that are visually perceptible to the human eye can be modeled mathematically using a device independent model such as, for example, Commission Internationale de l'Eclairage XYZ (CIE XYZ) color space, in which colors may be unambiguously specified without reference to external factors. Because most devices are incapable of rendering the totality of visible colors, the gamut of a typical device is some subset of the visually perceptible color space. When a color is beyond the physical rendering capability of a device, the color is termed as "out of gamut" for the device.

When colors represented by a color space in an input device are converted to a different color space in a destination device some colors in the input device may be out of the gamut of the destination device. For example, digital images, which can be specified in a Red-Blue-Green ("RGB") color space, are typically converted to a Cyan-Magenta-Yellow-Black ("CMYK") color space during the printing process. Colors in the input color space that are out of gamut in the destination color space may be approximated in the destination color space. For example, RGB colors that are out of gamut in the CMYK color space may be approximated by some combination of the CMYK color components.

One approach approximates an out of gamut color in a destination device by using a color within the gamut of the destination device that has a minimum color difference with respect to the input color. The minimum color difference ("MinCD") may be calculated using a variety of approaches specified by CIE, or other organizations. In practice, the minimum color difference can seek to reduce the perceptual or colorimetric color differences between the out-of-gamut colors being approximated by in-gamut colors. However, the application of such methods has typically involved repeated searching of the destination gamut surface to determine in-gamut and out-of-gamut colors. Next, additional processing involving the destination gamut surface may be performed to determine in-gamut approximations for out of gamut colors. Such repeated searching of and processing related to the destination gamut surface can be computationally expensive and inefficient. Thus, there is a need for efficient algorithms to identify and approximate out of gamut colors.

SUMMARY

Consistent with the present disclosure, systems and methods provide for a method for mapping at least one first color to a device gamut in a color space, wherein the device gamut is partitioned into a plurality of contiguous non-overlapping tetrahedra. In some embodiments, the method may comprise selecting candidate tetrahedra from the plurality of tetrahedra, wherein the selected candidate tetrahedra have at least one face exposed to the destination gamut surface. One or more bounding boxes enclosing the candidate tetrahedra may be searched to determine a bounding box that encloses the first color. In some embodiments, the bounding boxes may have edges that are aligned with the axes of the color space, and each bounding box may enclose a distinct candidate tetrahedron. In some embodiments, an equivalent second color in the device gamut may be determined, if the first color is determined to be within the bounds of the at least one selected candidate tetrahedron. If the first color is determined to be within the bounding box but lies outside the candidate tetrahedron, then clipping may be applied to the first color to determine the equivalent second color.

Embodiments of the present invention also relate to software, firmware, and program instructions created, stored, accessed, or modified by processors using computer-readable media or computer-readable memory. The methods described may be performed on a variety of computing devices, and peripherals, including printing devices.

Additional objects and advantages will be set forth in part in the description, which follows, and in part will be obvious from the description, or may be learned by practice. The objects and advantages will be realized and attained by means of the elements and combinations particularly pointed out in the appended claims. It is to be understood that both the foregoing general description and the following detailed description are exemplary and explanatory only and are not restrictive of the invention, as claimed. These and other embodiments are further explained below with respect to the following figures.

DETAILED DESCRIPTION

Reference will now be made in detail to various embodiments, which are illustrated in the accompanying drawings. Wherever possible, the same reference numbers will be used throughout the drawings to refer to the same or like parts.

Figure 1:
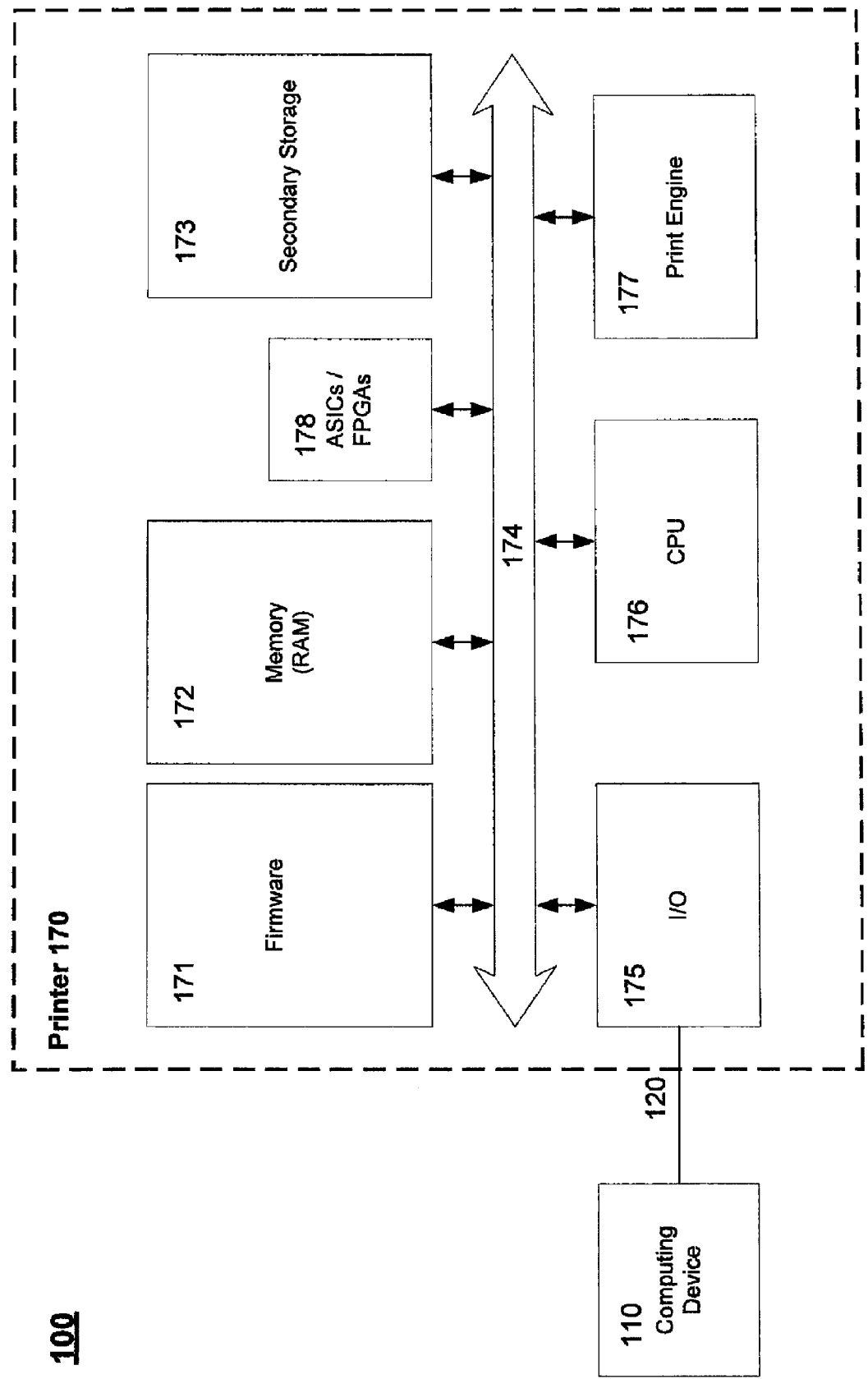
FIG. 1 shows a block diagram of a system with a computing device coupled to an output device, shown as an exemplary printer.

FIG. 1 illustrates an exemplary block diagram of a system 100 using a computing device 110 coupled to an output device, which is shown as exemplary printer 170, according to disclosed embodiments. Note that, in general, the methods disclosed may be performed on any graphic processing device that is capable of performing color conversion operations including computing device 110, exemplary printer 170 shown in system 100 in FIG. 1, and/or other devices that perform color space conversions, color management, and/or color translations. In some embodiments, the devices may receive input in a first color space and produce output in a second color space, which in some instances may be different from the first color space. The methods and apparatus described in this document may also be applied to the above device types with appropriate modifications and in a manner consistent with embodiments disclosed herein as would be apparent to one of ordinary skill in the art. For simplicity and ease of explanation, however, the methods are described with reference to exemplary printer 170.

In general, printer 170 may be any device that can be configured to produce physical documents from electronic data including, but not limited to, electro-photographic printers, such as laser printers and LED printers, ink-jet printers, thermal printers, laser imagers, and offset printers. Printer 170 may have image transmitting/receiving function, image scanning function, and/or copying function, as installed in facsimile machines and digital copiers. The methods and apparatus described in this document may also be applied to these various printer device types with appropriate modifications and in a manner consistent with embodiments disclosed herein.

In some embodiments, printer 170 may contain one or more input-output ports 175, and printer 170 may be able to communicate with and access resources on computing device 110 using I/O ports 175 and connection 120. Printer 170 may receive input print data, including color data, from computing device 110. For example, computing device 110 may be a general purpose computer that includes a monitor to display the input color data. The general purpose computer may further include applications, such as Adobe Photoshop™ to process data for output. In some embodiments, computing device 110 may take the form of an image generating device such as a digital camera.

Computing device 110 may be coupled to printer 170 via a wired or wireless connection 120 using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet, USB™, SCSI, FIREWIRE™, and/or coaxial cable ports for transmission of data through the appropriate connection. The data port may be a wired or wireless port.

Computing device 110 may use one color space to represent the input color data, such as, an RGB color space, an sRGB color space, or other types of color spaces. Printer 170, on the other hand, may use a color space native to printer 170 such as a CMY color space, a CMYK color space, or some other type of color space to represent color data prior to printing. In some embodiments, the native color space of printer 170 may not match the input color space of computing device 110. Therefore, a color conversion of the input color data from the input color space to the native color space of printer 170 may be performed prior to printing the color data using printer 170. In some embodiments, one or more color space conversions may be performed by using a conversion to an intermediate color space such as a Profile Connection Space ("PCS"), which in one instance may be a CIE XYZ color space.

Printer 170 may further include bus 174 that couples CPU 176, firmware 171, memory 172, print engine 177, and secondary storage device 173. Printer 170 may also include other Application Specific Integrated Circuits (ASICs), and/or Field Programmable Gate Arrays (FPGAs) 178 that are capable of executing portions of an application to perform color space conversions, gamut mapping, color translations, and other color management routines in a manner consistent with disclosed embodiments. In some embodiments, printer 170 may also be capable of executing software including a printer operating system and other appropriate application software, including software to perform color management functions. In some embodiments, printer 170 may allow paper sizes, output trays, color selections, and print resolution, among other options, to be user-configurable.

In some embodiments, CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including, but not limited to, a boot-up sequence, pre-defined routines, routines to perform color management, including color space conversions, luminance computations, look-up tables, and other code. In some embodiments, code and data in firmware 171 may be copied to memory 172 prior to being acted upon by CPU 176. In some embodiments, data and instructions in firmware 171 may be upgradeable.

In some embodiments, firmware 171 may also include routines to perform color space conversion related computations, and store the values in memory 172. When color space conversions are performed colors may be converted from an input color space to an output color space. In some embodiments, the color space conversion process may involve conversions from the input color space to one or more intermediate color spaces prior to conversion to an output color space. In some embodiments, the routines may include code that can be executed by CPU 176 and/or computing device 110 to perform portions of computations related to the determination and processing of in-gamut and out-of-gamut colors. Routines in firmware 171 may also include code to process the input color data and related color space information received from computing device 110, as well as gamut-mapping functions.

It is also contemplated that portions of routines to perform one or more color management related computations may be stored on a removable computer readable medium, such as a hard drive, computer disk, CD-ROM, DVD ROM, CD±RW or DVD±RW, USB flash drive, memory stick, or any other suitable medium, and may run on any suitable subsystem of printer 170. For example, portions of applications to perform computations related to gamut mapping and processing may reside on a removable computer readable medium and be read and acted upon by CPU 176 using routines in firmware 171 that have been copied to memory 172.

In some embodiments, CPU 176 may act upon instructions and data and provide control and data to ASICs/ FPGAs 178 and print engine 177 to generate printed documents. In some embodiments, ASICs/FPGAs 178 may also provide control and data to print engine 177. FPGAs/ASICs 178 may also implement one or more of translation, compression, and color conversion algorithms.

In some embodiments, input color data, an input color profile, native color profile, computed look-up tables, and converted color data may be stored in memory 172 or secondary storage 173. An input color profile can describe input color data 215 (FIG. 2), while a native color profile can describe the color behavior of the print engine 177. Exemplary secondary storage 173 may be an internal or external hard disk, Memory Stick™, or any other memory storage device capable of being used in and/or coupled to printer 170. Memory to store computed values and look-up tables may be a dedicated memory or form part of a general purpose memory, or some combination thereof according to some embodiments of the present invention. In some embodiments, memory may be dynamically allocated to hold the look-up table as needed. In some embodiments, memory allocated to store the look-up table may be dynamically released after processing.

Figure 2A:
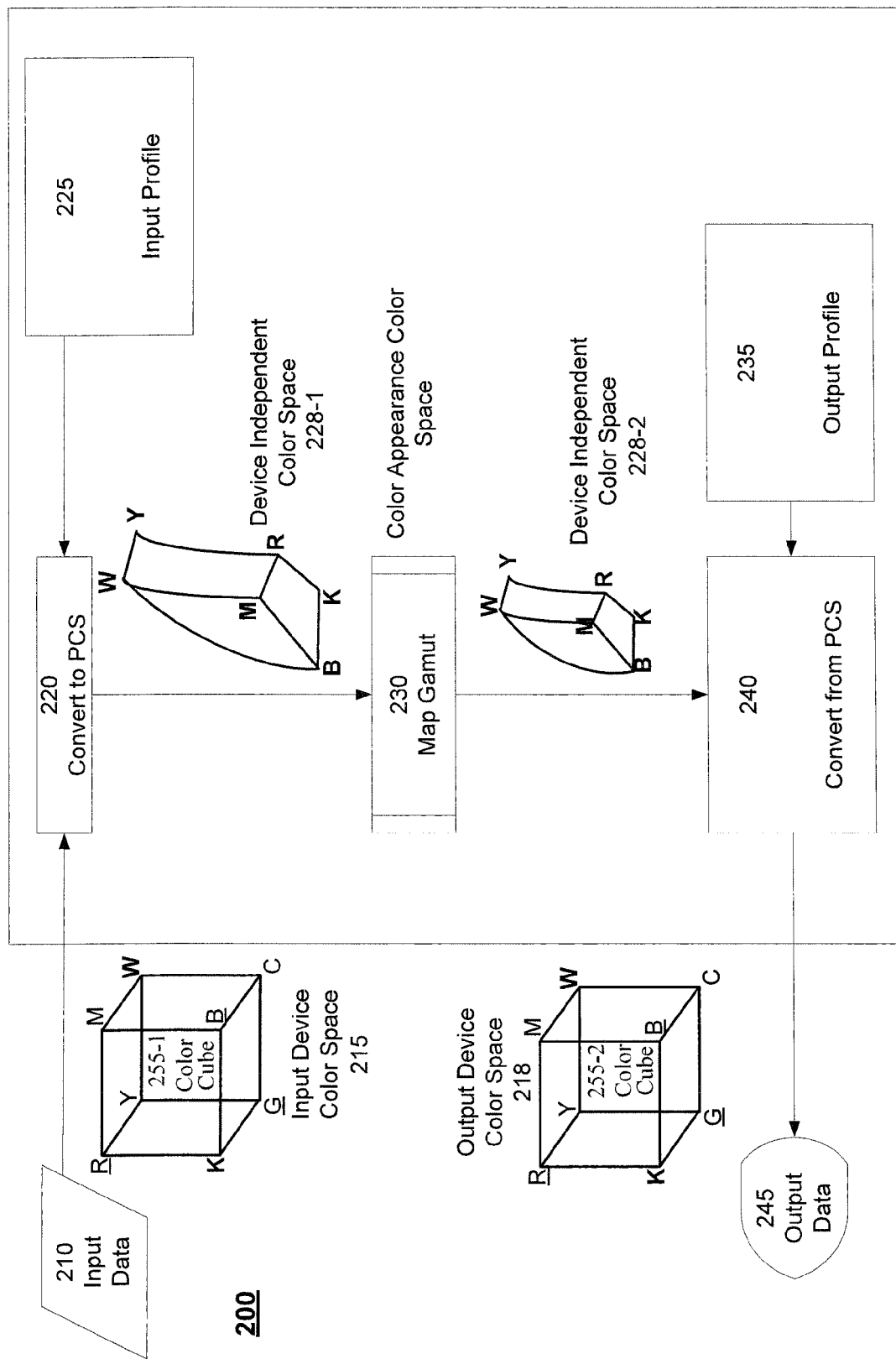
FIG. 2A shows a block diagram indicating an exemplary data flow for color conversion.

FIG. 2A shows a block diagram 200 indicating an exemplary data flow for color conversion. In some embodiments, the functions in steps 220 through 240 may be implemented and performed by a Color Management Module ("CMM").

Input data 210 in an input color space may be converted to a device independent space and/or a PCS in step 220. The complete set of colors that can be represented by a device is termed the gamut of the device. Colors in the input color space that can be represented by the input device form the gamut of the input device. Colors that can be represented by the input device in the input color space form the gamut of the input device, which may form a cube such as color cube 255-1.

In general, color cube 255 may be seen as one representation or some approximation of colors perceived by the human visual system, which uses three different sensors. For example, the three sensors may be represented as R, G, and B vectors and the three-dimensional color space may be modeled as a cube. One corner represents zero excitation for all three sensors, which may correspond to black ("K"). As shown in FIG. 2, there is a sensor vector along each of the three edges, which leave the K corner. The three vectors represent the extent of the stimulus for the R, G, and B sensors. This cube has white ("W") at the corner directly opposite black. For example, to describe the input color space, the three vectors may be viewed as comprising three primary colors red ("R"), green ("G"), or blue ("B"), which originate from the corner opposite complimentary secondary colors cyan ("C"), magenta ("M"), or yellow ("Y").

In some embodiments, input profile 225 may be used to perform the conversion from the input color space to device independent space and/or PCS 228-1. In some embodiments, input profile 225 may include an ICC specification, which permits the creation of a device-specific profile that describes the native device color space for a device, and additional related information needed to convert color data between this native device color space and a device independent color space, or PCS. The ICC profile format supports a variety of device-dependent and device-independent color spaces, including, for example, CIE XYZ based color spaces, RGB based color spaces, and CMYK based color spaces.

In some embodiments, input color profile 225 may specify an input color space. For example, a commonly known and/or widely used color space such as sRGB may be specified by input color profile 225. In one embodiment, a detailed ICC specification of the sRGB may be stored in memory 172 or secondary storage 173 of printer 170 and/or in computing device 110. In some embodiments, input color profile 225 may include the detailed ICC specification of the input color space. Input profile 225 may provide device specific color space definitions that may permit fine tuning of a generic color space conversion routine in step 220, thereby facilitating more color accurate PCS conversions of input data 210.

As shown in FIG. 2A, input data 210 coming in may be seen generally as being in some input device color space 215. Input profile 228-1 may be used to facilitate color transformations using look-up tables, matrices, and/or parametric curves. The profile constitutes an open specification of the color expected from encoded data in a digital image. Thus, the profiles permit the transformation of the device dependent input color specification to a standard or device independent color specification, which is known as a device independent color space or Profile Connection Space (PCS). After conversion, the gamut of the input device in the input device color space 215 may be transformed into a corresponding equivalent gamut in device independent color space 228-1.

Similarly, as shown in FIG. 2A, destination device color space 218, represented by color cube 255-2 may also be converted to device independent color space 228-2 using output profile 235. Accordingly, the gamut of the destination device in the destination device color space 218 may be transformed into a corresponding equivalent gamut in device independent color space 228-2.

In step 230, gamut mapping is performed to permit representation of input colors from the input gamut in device independent color space 228-1 in the destination gamut in device independent color space 228-2. In some embodiments, device independent color spaces 228-1 and 228-2 may be the same color space and could be the same as the color appearance space used in step 230. Colors in the input gamut (in device independent space 228-1) that cannot be represented in the destination gamut (in device independent space 228-2) may be altered to permit their representation in the destination gamut. For example, printers, which often use a CMYK color space, typically provide a smaller gamut than displays, which usually use an RGB color space. When the display and printing device gamut are represented in a device independent space, such as CIE XYZ, then some display colors may not map to colors in the printing device's gamut. Accordingly, in some instances, gamut mapping step 230 may determine an approximate color in the gamut of the output device to permit representation of a corresponding out of gamut color.

Gamut mapping routines 230 may also be characterized by their mapping schemes or rendering intent. In some embodiments, where color accuracy is desired, gamut mapping may occur to minimize differences colorimetric differences between the input and destination. In some embodiments, "perceptual mapping" may be used, in which perceptual differences between input and destination colors as perceived by the human eye are minimized. Color appearance models extend basic colorimetry to the prediction of appearance attributes under widely varying viewing conditions. Because the human eye is more sensitive to relative color differences, changing color mappings to preserve relative color differences (instead of attempting to preserve absolute color values) often yields better looking results. Accordingly, gamut mapping routines 230 may use one or more mapping schemes, rendering intents, or color appearance models when mapping input gamut colors to colors in the destination gamut. For simplicity and ease of explanation, the exemplary gamut mapping techniques are described herein with the objective of preserving calorimetric accuracy. However, the methods may also be applied when other objectives or rendering intents are used, as would be apparent to one of ordinary skill in the art. Because color models and objectives are often based on perception, these mappings are sometimes said to occur in a "color appearance" color space.

In some embodiments, gamut mapping routines 230 may operate in two stages. In the first stage, modules in gamut mapping routine 230 may provide a mapping from device independent color space to a color appearance space, in which both source colors and the destination gamut will be represented for further processing. In the second stage, gamut mapping routine 230 may provide a mapping from the color appearance space back to a device independent color space.

Color appearance spaces may include the CIE-Luv space, the CIE-LAB space, the CIECAM02 Jab color space, or any other perceptually uniform co-ordinate space. Details of these well-known color spaces are easily obtainable from CIE, and may also be obtained, for example, from "Color Appearance Models," Mark D. Fairchild, p. 265-77, 2005, John Wiley & Sons Ltd., West Sussex, England.

For color appearance spaces such as CIE-Luv, the axes of the space are defined in terms of lightness, chroma, and hue. Chroma is the ratio of "colorfulness" to the "brightness of white". Colorfulness is the perceived difference between the color of some stimulus and gray. Therefore, chroma is the colorfulness of a stimulus relative to the brightness of a stimulus that appears white under similar viewing conditions. Lightness is the ratio of brightness to the "brightness of White." Stated differently, lightness is the brightness of a stimulus relative to the brightness of a stimulus that appears white under similar viewing conditions. Hue refers to the gradation of color within the visible spectrum and is the degree to which a stimulus can be described as similar to or different from stimuli that are described as red, green, blue, and yellow.

In some embodiments, color data mapped to the gamut of the destination device by gamut mapping routines 230 may be converted from device independent space 228 to the destination color space in step 240 using output profile 235. Output data 245 in the destination color space may then be output.

Figure 2B:
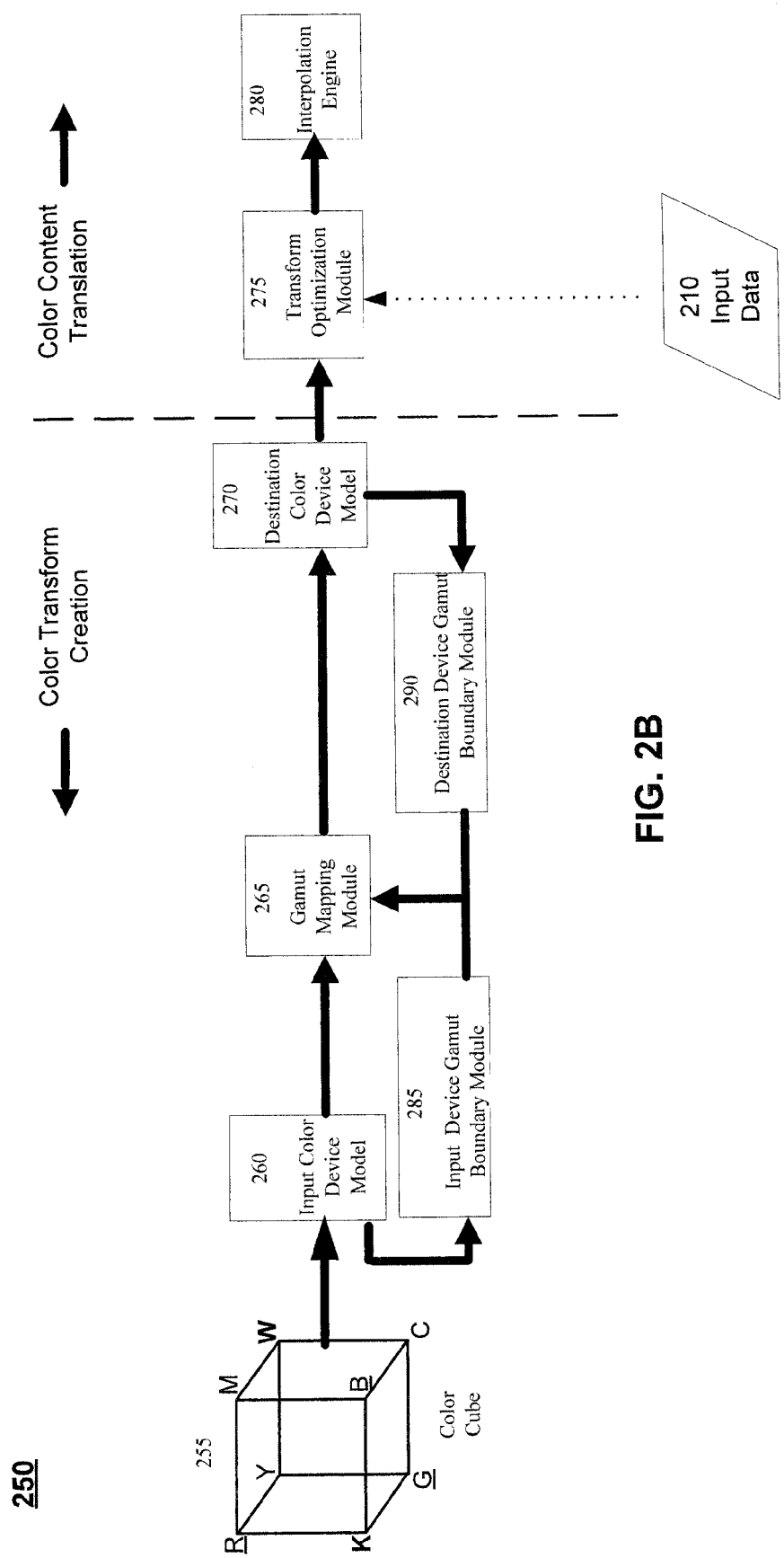
FIG. 2B shows an exemplary process flow outlining some steps in a color conversion process.

FIG. 2B shows an exemplary process flow 250 outlining some steps in a color conversion process. Process flow 250 includes steps 255 through 270, which may be performed as part of a color transform creation process pipeline, while steps 275 and 280 may be performed as part of a color content translation process pipeline that may use information generated during the earlier color transform process.

In some embodiments, the color transform creation process may use input and destination profiles, routines within a color management module, along with plug-in extensions to create a color transform. In some embodiments, routines in the CMM may apply the color transform to input image data 210 to create output data 245 mapped to the destination device gamut. For simplicity and ease of explanation some intermediate steps may have been omitted in the description of the pipelines. In some embodiments, the process flow 250 may be part of a color management system, which in one instance could be the Microsoft™ Windows™ Color System ("WCS").

Input Color Device Model 260 and Destination Device Color Model 270 may be created and specified in terms of color cube 255, using their respective device profiles 225 and 235. Input Color Device Model 260, which may include convert to PCS routine 220, may perform color space conversions from the input color space to a device-independent color space, such as exemplary device-independent color space 228-1. Conversely, destination device color model 270, which can include convert from PCS routine 240, may perform color space conversions from device-independent color space 228-2 to the destination color space. In some embodiments, destination device color model 270 may also include a convert to PCS routine. In some embodiments, both Input Color Device Model 260 and Destination Device Color Model 270 may be capable of utilizing mathematical equations, statistical techniques, and/or LUTs to perform their functions. In some embodiments, the models may be modified, altered, replaced, and/or augmented using "plug-in" modules that may act in concert with the existing model. For example, WCS allows plug-in modules that can replace baseline models and facilitate the addition of functionality.

In some embodiments, input device gamut boundary module 285 and destination gamut boundary module 290 may compute the gamut boundaries for the input and destination device, respectively, using the device model profile and routines available in the CMM. In some embodiments, the boundary modules may compute a convex boundary corresponding to a convex hull of the gamut. In some embodiments, the boundary may be computed by surrounding the lattice points with a surface. In some embodiments, the boundary may be provided to gamut mapping module 265 as an ordered list of the vertices.

Gamut mapping module 265 may use the input device and destination device gamut boundaries, which may be provided in the form of an ordered vertex list of each device's gamut boundary, to map color from first gamut, such as one in exemplary device independent color space 228-1, to a second gamut, such as one in exemplary device independent color space 228-2, while satisfying constraints on the output color. For example, the constraint may specify that hue, lightness, or hue and lightness be preserved to the extent possible during gamut mapping. In some embodiments, gamut mapping module 265 may make use of one or more gamut mapping models. In some embodiments, one or more gamut mapping models and/or algorithms in gamut mapping module 265 may be provided as a plug-in and may be used to modify, alter, and/or augment any pre-existing baseline algorithms. For example, WCS provides a plug-in functionality to enable replacement of baseline gamut mapping algorithms.

In conventional schemes, to determine if input colors are out of the gamut of the destination device, and determine an approximate match, a method using tetrahedral interpolation and Minimum Color Difference ("MinCD") is often used. The gamut of a device is typically represented by a table that maps a set of sampled in-gamut colors from the device independent color space to the device's color space. Accordingly, to map a non-sampled color accurately, interpolation can be used between neighboring colors to determine an approximate corresponding color in the color space of the reproduction device. Conventionally, interpolation involves searching the samples for the most appropriate set of neighboring colors, which are used for the interpolation. One such appropriate set is the set of colors that forms a bounding tetrahedron of the color being interpolated. Tetrahedral interpolation yields reasonably accurate results for interpolated colors. Accordingly, conventional methods for performing interpolations perform the following steps:

1. Find non-overlapping tetrahedrons covering the entire gamut of the destination device.
2. For each input color, search the tetrahedrons for one that encloses the input color.
3. If a bounding tetrahedron is found, interpolate to find the coordinates of the color within the color space of the reproduction device.
4. If no bounding tetrahedrons are found, the color is out of gamut and the MinCD method may be used to find an appropriate color on the surface of an appropriate tetrahedron.
5. After an appropriate tetrahedron has been found for out of gamut colors, tetrahedral interpolation is used to find an equivalent in-gamut color within the color space of the destination device.

In the conventional method described above, all tetrahedrons may be searched prior to making a determination that a color is out of gamut. Next, an appropriate tetrahedron is determined for each out-of-gamut color. Finally, tetrahedral interpolation may be applied to find the in-gamut equivalent for the out-of-gamut color. Therefore, as the number of out-ofgamut colors increases there is a significant increase in computational cost and a consequent degradation in performance.

Color gamut translations from an input to a destination often involve gamut compression. For example, the color gamut of display devices and graphic cards are typically more expansive than the color gamut of printing devices. Accordingly, pre-existing or manufacturer-provided algorithms in gamut mapping module 265 may not always map all input colors to within the gamut of the destination device. In other instances, manufacturer-provided algorithms may simply be inadequate to map all input colors to the destination space. Therefore, a large number of colors in input data 210 may be out of gamut when the data arrives at gamut mapping module 265. In some instances, as many as 25% of all colors arriving at gamut mapping module 265 may be out of gamut. As noted above, any increase in the number of out of gamut colors can significantly slow down the interpolation engine and the conventional color content translation process.

During the color content translation process, transform optimization module 275 may generate a single LUT that provides a direct mapping from the input color space to the destination color space, using representative samples from the input color space, and running the samples through the color transforms created during the color transform creation process. When processing input data 210, any samples that are not found in the Input-Destination LUT are interpolated using interpolation engine 280.

Figure 3:
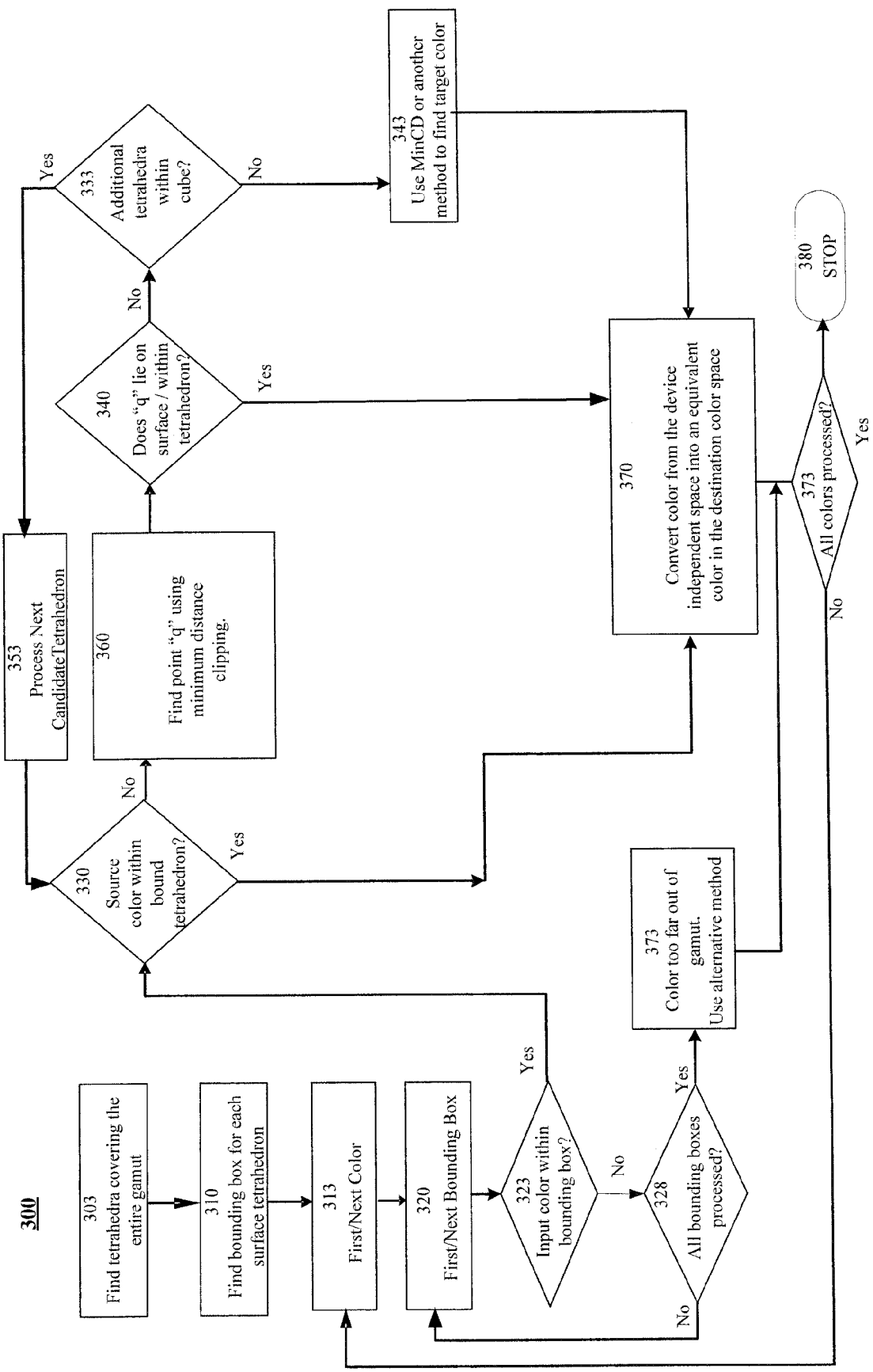
FIG. 3 shows a flowchart illustrating an exemplary method for approximation of out-of-gamut colors in a manner consistent with disclosed embodiments.

FIG. 3 shows a flowchart illustrating an exemplary method 300 for approximation of out-of-gamut colors in a manner consistent with disclosed embodiments. In some embodiments, exemplary method 300 may be implemented in gamut mapping module 265 or provided as a plug-in to replace, modify, and/or augment pre-existing, manufacturer-provided, and/or baseline algorithms in gamut mapping module 265. In some embodiments, method 300 may operate concurrently with existing algorithms in gamut mapping module 265. Note that the description of exemplary method 300 in relation to the process flow in FIG. 2A is exemplary and for descriptive purposes only and that method 300 may be applied to other gamut mapping and interpolation processes with suitable modifications as would be apparent to one of ordinary skill in the art.

In step 303, non-overlapping contiguous tetrahedra covering the entire destination device gamut may be defined in a first color space, which may be exemplary device color space 218. In some embodiments, the destination device gamut may first be divided into one or more color cubes 255-2, which may then be partitioned into tetrahedra. Color cubes that enclose tetrahedra with faces that form the destination device gamut surface may be checked for the destination color by using their mapped equivalents in device independent color space 228-2. For example, the color cubes covering the destination gamut may be mapped to the CIE-Luv, or CIE-Lab, or any other appropriate perceptually uniform device independent color space.

Figure 4:
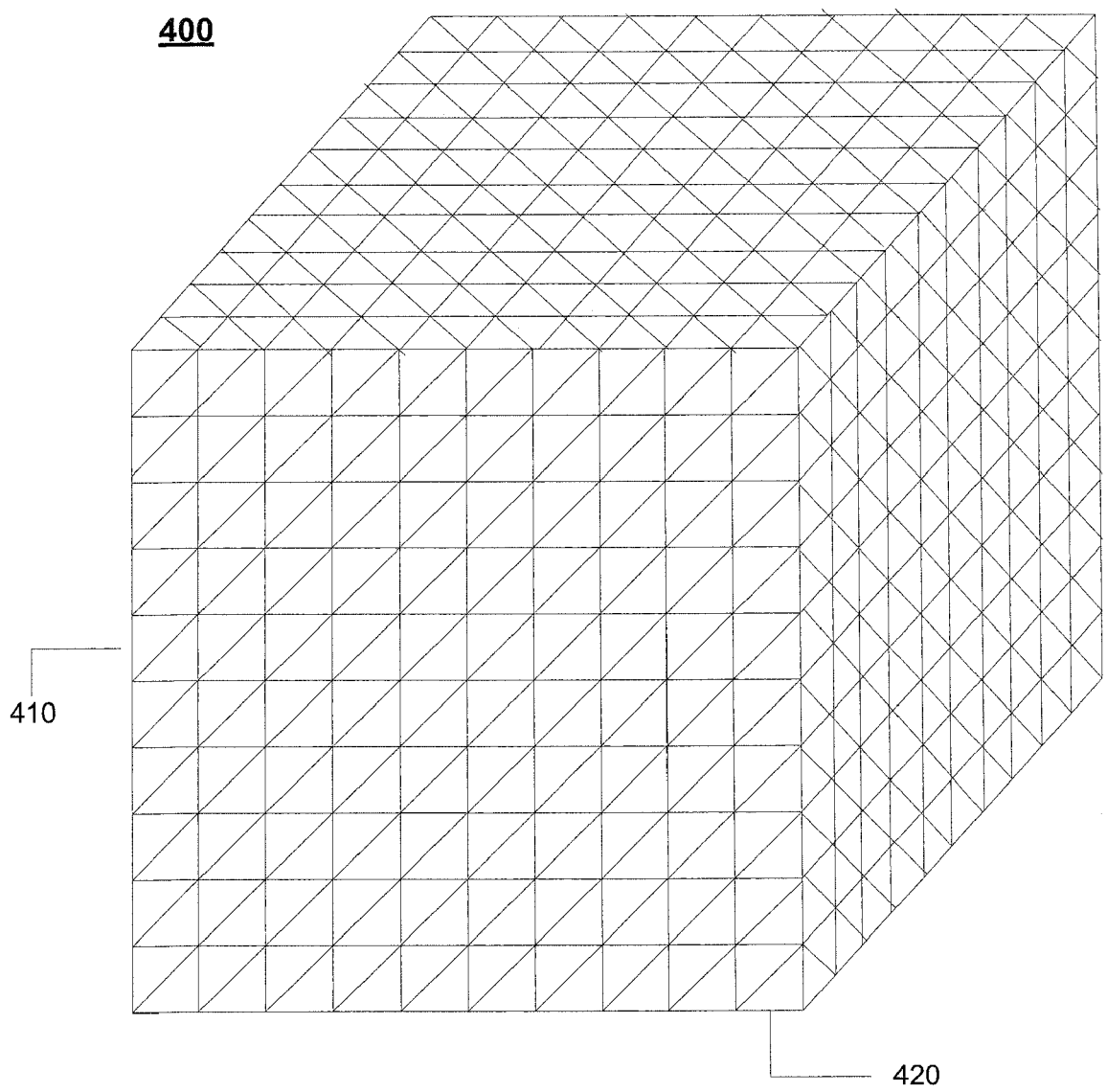
FIG. 4 shows an exemplary color space with a plurality of color cubes divided into tetrahedra in a manner consistent with disclosed embodiments.

FIG. 4 shows an exemplary color space comprising color cube 410 with a plurality of sub-color cubes 420 divided into tetrahedra in a manner consistent with disclosed embodiments. For example, destination device color space 218 may be divided into a plurality of color-cubes 420. Each color-cube (or sub-cube) 420 may represent a portion of the destination device space 218.

Figure 5:
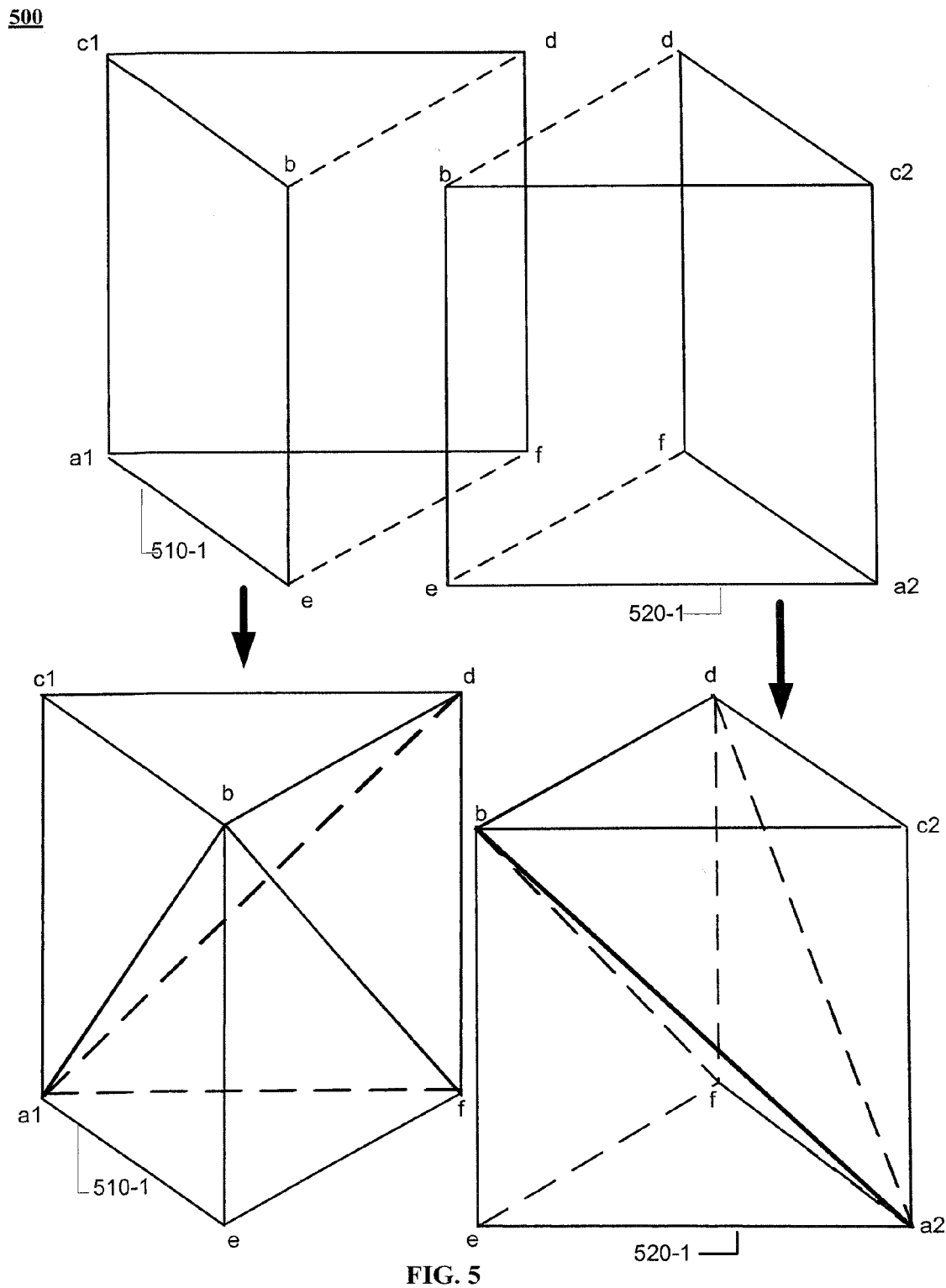
FIG. 5 shows an exemplary individual color cube, which can be divided into tetrahedra in a manner consistent with disclosed embodiments.

FIG. 5 shows an exemplary individual color cube, which can be divided into tetrahedra in a manner consistent with disclosed embodiments. In some embodiments, an individual color cube may be divided into tetrahedra as shown in FIG. 5. As shown in FIG. 5, a color cube may be divided into two equal prisms 510-1 and 520-1, which can each be divided into 3 tetrahedra. Accordingly, as shown in FIG. 5, a color cube may be divided into 6 tetrahedra. Each tetrahedron may be specified by a triangle and a vertex in space outside the plane of the triangle. Accordingly, prism 510-1 comprises 3 tetrahedra 510-2 given by vertex a1, and triangles (b, c1, d), (b, e, f), and (b, d, f), respectively. Similarly, prism 520-1 comprises 3 tetrahedra 520-2 given by vertex a2 and triangles (b, c2, d), (b, e, f), and (b, d, f), respectively. Note that two faces of each tetrahedron lie along faces of the cube. Each remaining face is shared with an adjacent tetrahedron. Note that with the exception of cubes lying along corners or edges of color space 410, each tetrahedron also shares at least two faces with adjacent cubes.

Figure 6:
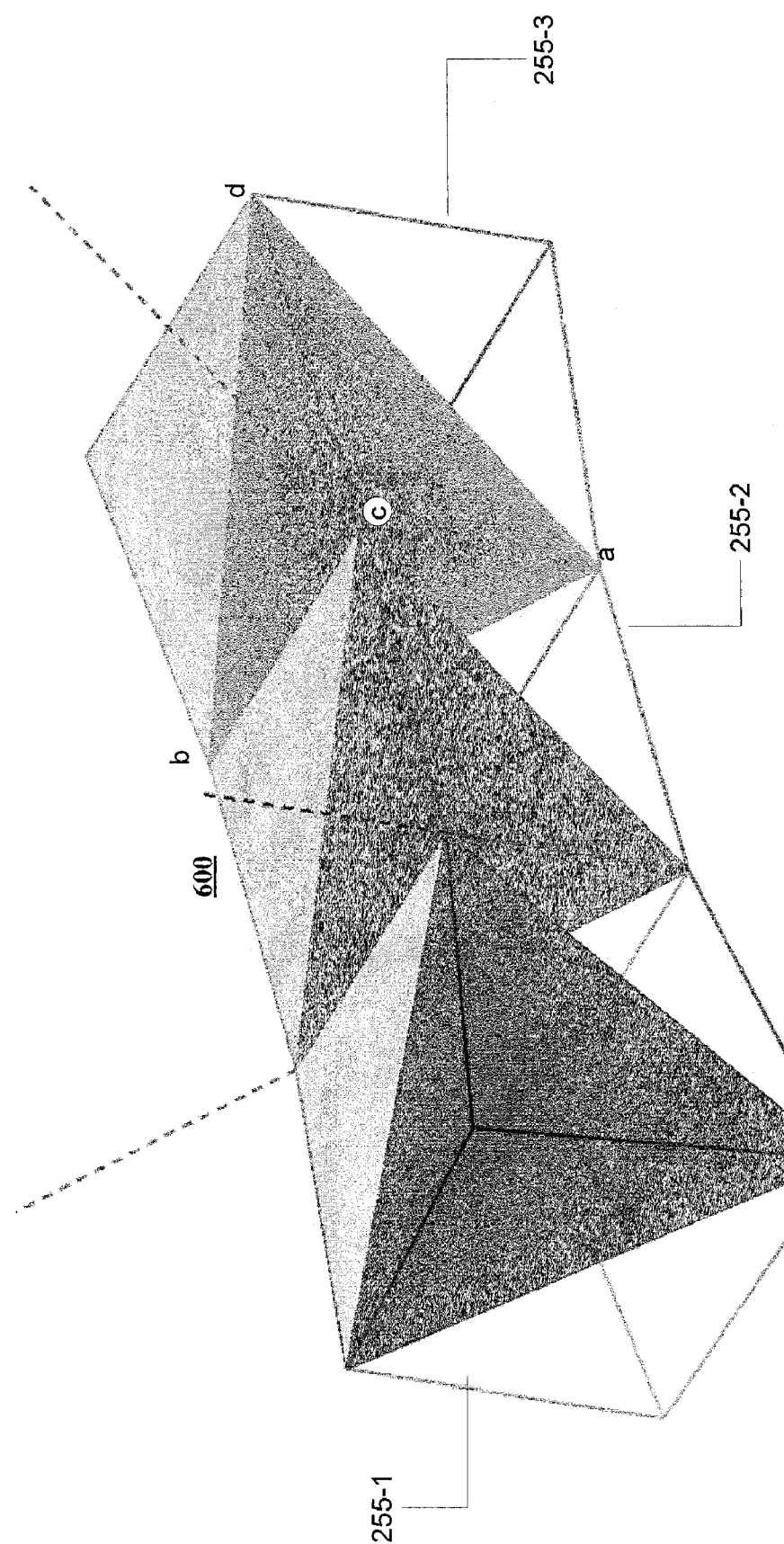
FIG. 6 shows three adjacent color cubes on a section of a gamut surface.

FIG. 6 shows three adjacent color cubes 255-1, 255-2, and 255-3 on a section of destination device gamut surface 600. Note that only a portion of the device gamut surface 600 has been shown in FIG. 6. In some embodiments, destination gamut surface 600 may correspond to the gamut of destination device in a device independent color space such as exemplary device independent color space 228-2. In some embodiments, colors from the gamut of an input device in exemplary device independent color space 228-1 may be mapped to colors on or within gamut surface 600 in device independent color space 228-2. In some embodiments, gamut surface 600 may be a convex surface.

Figure 7:
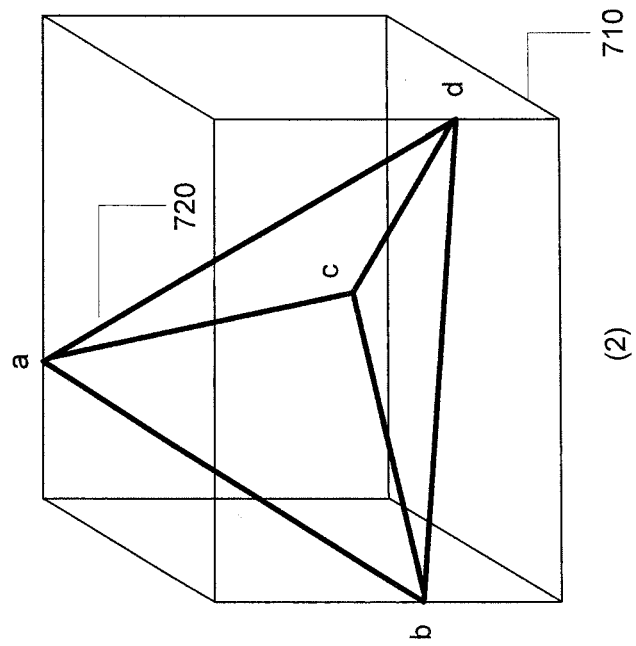
FIG. 7 shows two different perspectives of an exemplary tetrahedron inside exemplary bounding box.
Figure 7:
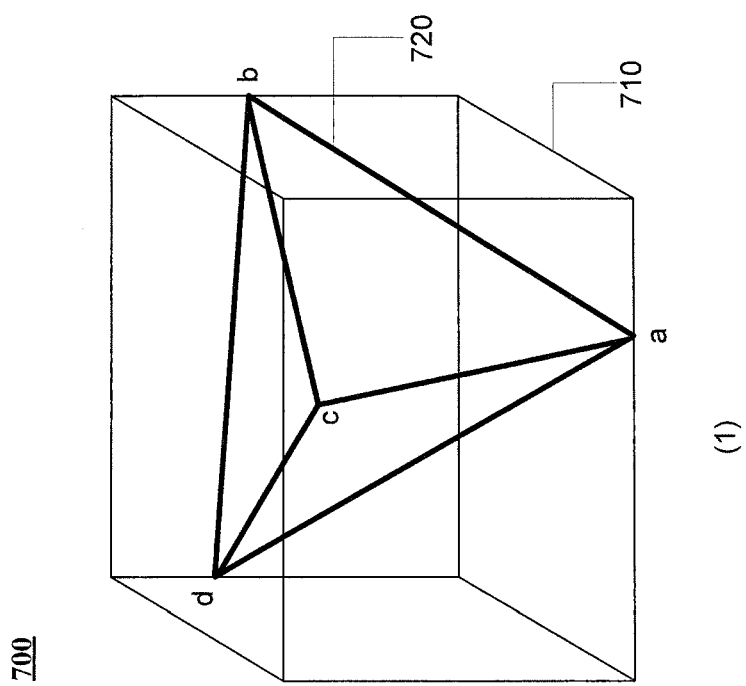

Next, in step 310, in some embodiments, a bounding box may be determined for each tetrahedron in the destination gamut. FIG. 7 shows two different perspectives (1) and (2) 700 of an exemplary tetrahedron 720 inside exemplary bounding box 710. Bounding box 710 has edges that are aligned with the axes of the color space, which in this example is the rectangular CIE-Luv space. Further, bounding box 710 encloses tetrahedron 720 so that each vertex of tetrahedron 720 lies on a distinct face, edge, or vertex of bounding box 710. Accordingly, as shown in FIG. 7, vertices a, b and d of tetrahedron 720 lie on edges of bounding box 710, while vertex c lies on a face of bounding box 710.

In step 313, the first or next color in sequence may be selected for processing. Next, the algorithm iterates through steps 320, 323, and 328 for each destination color, until an enclosing bounding box 720 is found. If no bounding box 720 is found, the color may be too far out of gamut. Accordingly, in step 378, in some embodiments, the condition may be flagged, and a variety of alternative algorithms may be invoked to identify an equivalent color in the destination device gamut.

If bounding box 720 that encloses the destination color is found ("Yes") in step 323, then in step 330, the algorithm may check if the input color is within bound tetrahedron 710. The equation: $\vec{ap} = s\vec{ab} + t\vec{ac} + u\vec{ad}$ (1) may be used to determine whether the destination color is inside the tetrahedron. In the equation above, a, b, c, and d are the vertices of the tetrahedron with the triangle bcd forming part of the gamut surface; p is a point in the CIE-Luv coordinate space representing the destination color and $\vec{ap}$ is the vector from a to p, and $\vec{ab}$, $\vec{ac}$, and $\vec{ad}$ are vectors from vertex "a" to vertices "b", "c", and "d", respectively.

Equation (1) may be solved for the coefficients s, t, and u using a series of linear equations. If s, t, and u are all positive (>0) and s+t+u<=1, the destination color is inside the tetrahedron. When s+t+u>1, and s, t, and u are all positive, point "p" is outside of triangle bcd of the tetrahedron abcd.

Next, in step 323, adjacent tetrahedra inside the bounding box may be checked. As noted earlier, two faces in each tetrahedron are typically shared with distinct adjacent cubes. For example, as shown in FIG. 5, in tetrahedron a1-b-c1-d faces a1-b-c1 and a1-c1-d may be shared with distinct adjacent color cubes (if there are neighboring cubes in those directions). The conditions s>0, t>0, and u>0 imply that point "p" be in the positive direction of the vectors $\vec{ab}, \vec{ac},$ and $\vec{ad}$ which may correspond to vectors $\vec{a1b}, \vec{a1c1},$ and $\vec{a1d}$ in FIG. 5. Therefore, when s+t+u>1, the point "p" is outside tetrahedron a1-b-c1-d, and further is not within any neighboring color cubes that may share faces a1-b-c1 and a1-c1-d with tetrahedron a1-b-c1-d. However, the point may be in other neighboring cubes. In some embodiments, the list of bounding boxes and/or tetrahedra being searched for the current input color may be modified to add tetrahedra in the positive direction of the vectors $\vec{ab}, \vec{ac},$ and $\vec{ad}$, and delete tetrahedra that can be eliminated as candidates based on their location relative to the above vectors. For example, tetrahedra/bounding boxes that share vertex a with the current tetrahedron may be deleted.

If the color is within the bound tetrahedron ("Yes") in step 330, then the algorithm may proceed to step 370. If the color is not within the bound tetrahedron ("No") in step 330, then, in step 360, a point "q", representing the closest approximation of the source color in the destination gamut may be determined by finding the intersection of the b-c-d plane with a line p-p', where p' is a point with the same lightness (L) but with a 0 (zero) chroma $\sqrt{u^2+v^2}$ value. If point "q" lies on the surface of the bound tetrahedron ("Yes") in step 340 then the algorithm proceeds to step 370. The process in steps 360 and 340 is termed clipping because the color is "clipped" to its nearest equivalent on the gamut surface.

Figure 8:
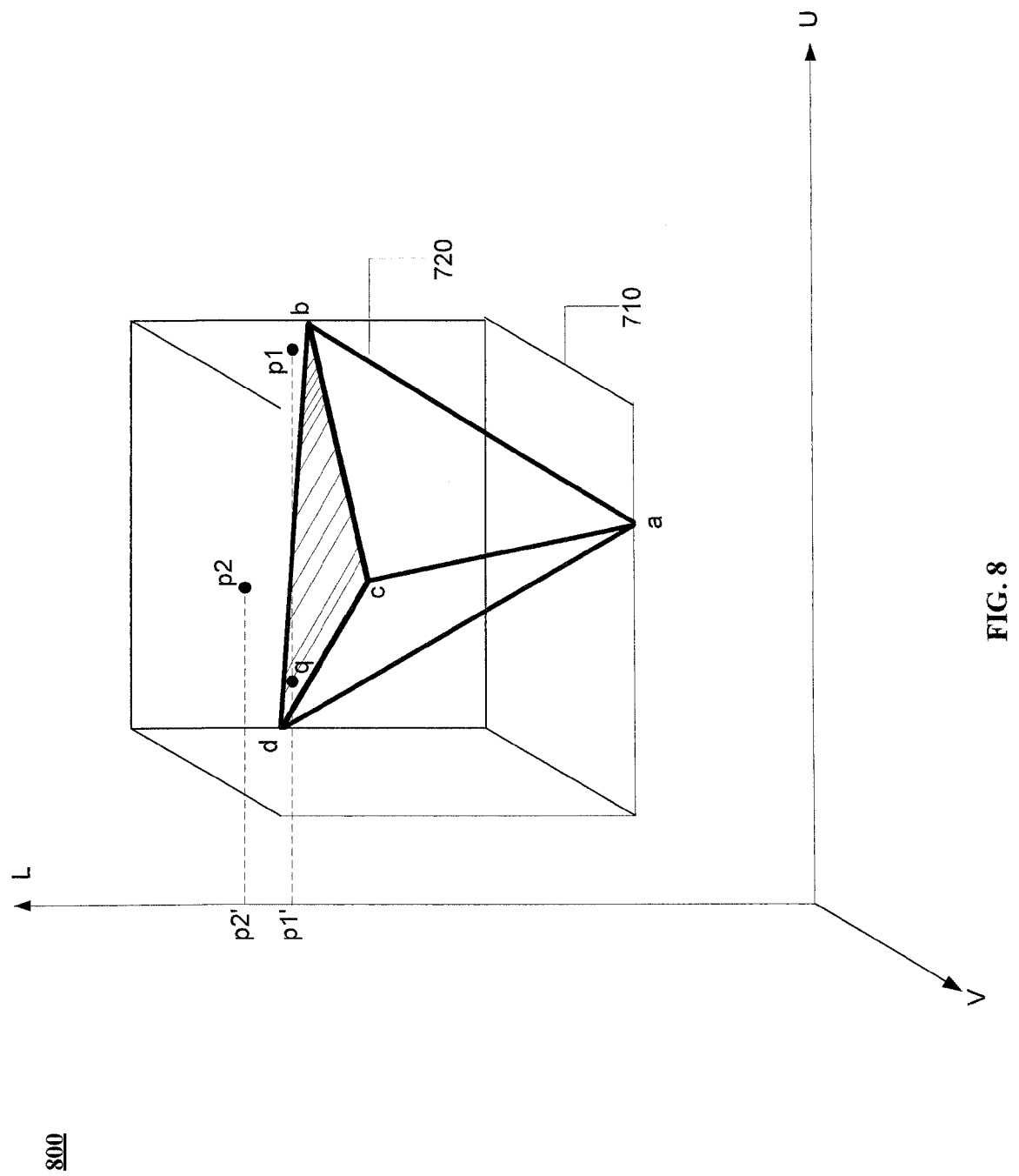
FIG. 8 illustrates clipping using two exemplary points "p1" and "p2" lying outside a gamut surface b-c-d.

FIG. 8 illustrates clipping using two exemplary points "p1" and "p2" lying outside a gamut surface b-c-d. Gamut surface b-c-d may be a face of tetrahedron 720 within bounding box 710. As shown in FIG. 8, points p1 and p2 lie outside the triangle b-c-d. As shown in FIG. 8, point p1' and p2' are points with a 0 chroma $\sqrt{u^2+v^2}$ value, but with the same L value as points "p1" and "p2", respectively. The line p1-p1' intersects the b-c-d triangle at point q. Accordingly, "q" can be used as an equivalent clipped color for the color represented by point p1.

In step 370, conventional tetrahedral interpolation or any other method of processing may be used to determine the destination color in the destination color space from its input or device independent equivalent.

If the "q" does not lie on the surface of the bound tetrahedron ("No") in step 340, then, in step 333, the algorithm may check if there are other candidate tetrahedra in the color cube. For example, for point p2, the line p2-p2' does not intersect the triangle b-c-d. Therefore, an alternate tetrahedron/cube on the gamut surface can be searched to find an equivalent color for point p2.

If the clipped color has not been determined and there are additional tetrahedra in the color cube to be processed ("Yes") in step 333, then in step 353, the next candidate tetrahedron in the same color cube may be selected for processing. In some embodiments, the next candidate tetrahedron to be selected may be another tetrahedron with a face on the gamut surface.

The algorithm iterates through steps 330, 360, 340, 333, and 353 until a bound tetrahedron is found containing the color is found, or all tetrahedra have been processed. If no tetrahedra remain to be processed ("No") in step 333, the MinCD method, or any alternate method may be used to find the destination color in step 343. The algorithm checks if all colors have been processed in step 373. If all colors have been processed, ("Yes") in step 373, the algorithm may terminate in step 380. If additional colors remain to be processed then the algorithm proceeds to step 313.

In exemplary method 300, bounding boxes may be quickly searched to determine whether an input color falls within the bounding box. Once a candidate bounding box has been identified method 300 may be able to find a match for colors, which are out of gamut, but close enough to the gamut surface to be within a few bounding boxes of the surface facing candidate color cube. In some embodiments, exemplary method 300 permits determination of an equivalent destination color even when the source color is out of gamut, if the equivalent color lies within the bounding box of the tetrahedron being searched. Further, when compared to the conventional method, a lower number of candidate tetrahedrons and/or a lower number of triangle faces may be searched when performing clipping.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for mapping at least one first color to a device gamut in a color space, wherein the device gamut is partitioned into a plurality of contiguous non-overlapping tetrahedra, the method comprising:
    selecting, by a computer, at least one tetrahedron from the plurality of tetrahedra as a selected candidate tetrahedron, wherein the selected candidate tetrahedron has at least one face on the device gamut surface;
    searching at least one bounding box enclosing the selected candidate tetrahedron to determine whether the at least one bounding box encloses the first color, wherein the at least one bounding box at least one color that falls outside the device gamut and the edges of the at least one bounding box are aligned with the axes of the color space;
    determining a first equivalent second color in the device gamut, if the first color is determined to be within the bounds of the selected candidate tetrahedron; and
    applying clipping to the first color to determine a second equivalent second color, if the first color is determined to be within the at least one bounding box and outside the selected candidate tetrahedron.

2. The method of claim 1, wherein the method is implemented as a plug-in to a color management system.

3. The method of claim 2, wherein the color management system is WCS.

4. The method of claim 1, wherein the determination of whether the input color lies within the bounds of the selected candidate tetrahedron is made based on the values of coefficients s, t, and u, which satisfy $\vec{ap}=s\vec{ab}+t\vec{ac}+u\vec{ad}$, where:
    a, b, c, and d are the vertices of the selected candidate tetrahedron;
    p is a point in the color space representing the first color;
    $\vec{ap}$ is the vector from a to p; and
    $\vec{ab}, \vec{ac},$ and $\vec{ad}$ are vectors from vertex "a" to vertices "b", "c", and "d", respectively.

5. The method of claim 4, wherein the input color is determined to be within the bounds of the selected candidate tetrahedron, if s, t, and u are all positive and non-zero and s+t+u≦1.

6. The method of claim 4, wherein the first color is determined to be outside the bounds of the selected candidate tetrahedron, if s, t, and u are all positive and non-zero and s+t+u >1.

7. The method of claim 6 further comprising:
adding at least one tetrahedron to the top of a set of candidate tetrahedra as an added candidate tetrahedron, wherein the added candidate tetrahedron is adjacent to the selected candidate tetrahedron; and
removing at least one tetrahedron from the set of candidate tetrahedra, wherein the removed tetrahedron is adjacent to the selected candidate tetrahedron and shares a vertex with the selected candidate tetrahedron.

8. The method of claim 1, wherein the color space is a perceptually uniform device independent color space.

9. The method of claim 8, wherein the device independent color space is one of a CIE-Luv color space, a CIE-LAB color space, or a CIECAM02 Jab color space.

10. The method of claim 1, further comprising using minimum color difference ("MinCD") to determine an equivalent second color within the device gamut, if the first color lies within the at least bounding box but does not lie within the bounds of the selected candidate tetrahedron.

11. A non-transitory computer-readable medium that contains instructions which, when executed by a processor, perform steps in a method for mapping at least one first color to a device gamut in a color space, wherein the device gamut is partitioned into a plurality of contiguous non-overlapping tetrahedra, the method comprising:
selecting at least one tetrahedron from the plurality of tetrahedra as a selected candidate tetrahedron, wherein the selected candidate tetrahedron has at least one face on the device gamut surface;
searching at least one bounding box enclosing the selected candidate tetrahedron to determine whether the at least one bounding box encloses the first color, wherein the at least one bounding box encloses at least one color that falls outside the device gamut and the edges of the at least one bounding box are aligned with the axes of the color space;
determining a first equivalent second color in the device gamut, if the first color is determined to be within the bounds of the selected candidate tetrahedron; and
applying clipping to the first color to determine a second equivalent second color, if the first color is determined to be within the at least one bounding box and outside the selected candidate tetrahedron.

12. The non-transitory computer-readable medium of claim 11, wherein the method is implemented as a plug-in to a color management system.

13. The non-transitory computer-readable medium of claim 12, wherein the color management system is WCS.

14. The non-transitory computer-readable medium of claim 11, wherein the determination of whether the input color lies within the bounds of the selected candidate tetrahedron is made based on the values of coefficients s, t, and u, which satisfy $\vec{ap}=s\vec{ab}+t\vec{ac}+u\vec{ad}$, where:
a, b, c, and d are the vertices of the selected candidate tetrahedron;
p is a point in the color space representing the first color;
$\vec{ap}$ is the vector from a to p; and
$\vec{ab}$, $\vec{ac}$, and $\vec{ad}$ are vectors from vertex "a" to vertices "b", "c", and "d", respectively.

15. The non-transitory computer-readable medium of claim 14, wherein the input color is determined to be within the bounds of the selected candidate tetrahedron, if s, t, and u are all positive and non-zero and s+t+u≦1.

16. The non-transitory computer-readable medium of claim 14, wherein the first color is determined to be outside the bounds of the candidate tetrahedron, if s, t, and u are all positive and non-zero and s+t+u>1.

17. The non-transitory computer-readable medium of claim 16 further comprising:
adding at least one tetrahedron to the top of a set of selected candidate tetrahedra as an added candidate tetrahedron, wherein the added candidate tetrahedron is adjacent to the selected candidate tetrahedron; and
removing at least one tetrahedron from the set of selected candidate tetrahedra, wherein the removed tetrahedron is adjacent to the selected candidate tetrahedron and shares a vertex with the selected candidate tetrahedron.

18. The non-transitory computer-readable medium of claim 11, wherein the color space is a perceptually uniform device independent color space.

19. The non-transitory computer-readable medium of claim 18, wherein the device independent color space is one of a CIE-Luv color space, or a CIE-LAB color space, or a CIECAM02 Jab color space.

20. The non-transitory computer-readable medium of claim 11, further comprising using minimum color difference ("MinCD") to determine an equivalent second color within the device gamut, if the first color lies within the at least bounding box but does not lie within the bounds of the selected candidate tetrahedron.

* * * * *